Jan. 17, 1967   D. L. BABCOCK   3,298,625
TAKE-UP REEL FOR MOTION-PICTURE PROJECTOR
Filed March 15, 1965

DAVID L. BABCOCK
INVENTOR.

BY R. Frank Smith
Steve W. Gremban
ATTORNEYS

United States Patent Office 3,298,625
Patented Jan. 17, 1967

3,298,625
TAKE-UP REEL FOR MOTION-PICTURE PROJECTOR
David L. Babcock, Rochester, N.Y., assignor to Eastman Kodak Company, Rochester, N.Y., a corporation of New Jersey
Filed Mar. 15, 1965, Ser. No. 439,919
7 Claims. (Cl. 242—71.8)

This invention relates generally to reels, and more specifically to an improved take-up reel for a motion-picture projector or the like.

It is well known in the motion-picture projector art to use a take-up reel having a band slidably mounted on a hub and wherein the band is provided with outwardly extending teeth for engaging the perforations of a film fed into engagement therewith. Reels of this general type are disclosed in U.S. Patents 1,322,114 and 3,053,465. Since the take-up reel is normally driven at a rotational velocity such that the band is traveling faster than the speed at which the film is fed, the film is subjected to a pull or jerk when it initially engages the teeth on the band. The film perforations are prevented from tearing by the slippage that occurs between the band and hub. One of the disadvantages of such prior known reels is that the resistance to turning of the band on the hub varies depending upon what portion of the band is first engaged by the leading end of the film, thus subjecting the film to pulls of different force. Another disadvantage of some of these prior known reels is that the band has to be constructed to close tolerances in order to fit properly on the hub, and to provide the proper frictional engagement between the band and hub for subjecting a film attached thereto while the reel is rotating to a constant pull no matter where it engages the band. Applicant's improved take-up reel eliminates these and other disadvantages of prior known take-up reels.

The take-up reel of this invention comprises a rotatably driven hub member onto which a film is wound, a clutch member rotatable relative to the hub member, and resilient means for urging the two members into frictional engagement. The hub member further has flanges for guiding a film wound thereon, and teeth on the clutch member for engaging the perforation of a film fed thereto. Since the film normally travels at a speed slower than the periphery of the hub member, slippage occurs between the hub and clutch members to prevent the film from breaking.

One of the objects of the present invention is to provide an improved take-up reel for a movie projector or the like.

Another object of the invention is to provide an improved take-up reel for a movie projector or the like having a clutch member for subjecting a film attached thereto while the reel is rotating to a constant pull no matter where the film engages the clutch member.

Another object of the invention is to provide an improved reel for a motion-picture projector or the like that is of simple design and construction, thoroughly reliable and efficient in operation, and economical to manufacture.

Objects and advantages other than those set forth above will be apparent from the following description when read in connection with the accompanying drawing, in which.

Figure 4:
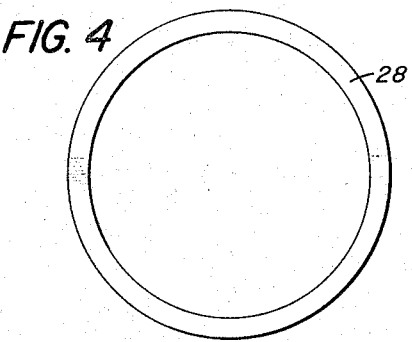
FIG. 4 is a side elevation view of the spring shown in FIG. 1.
Figure 3:
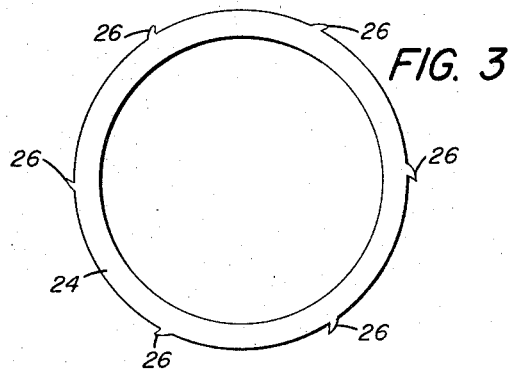
FIG. 3 is a side elevation view of the clutch disk shown in FIG. 1.
Figure 1:
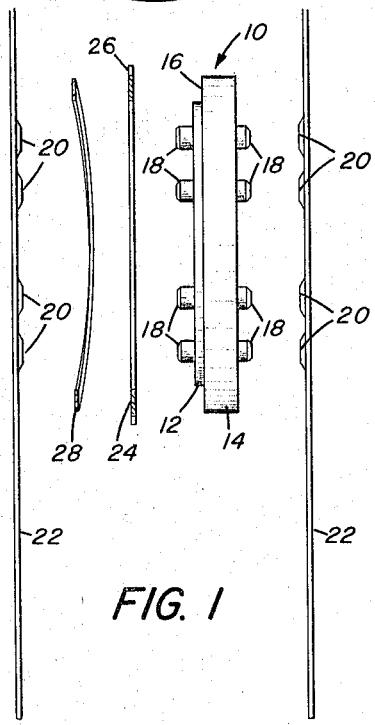
FIG. 1 is an exploded front elevation view of a take-up reel constructed in accordance with one embodiment of this invention.
Figure 2:
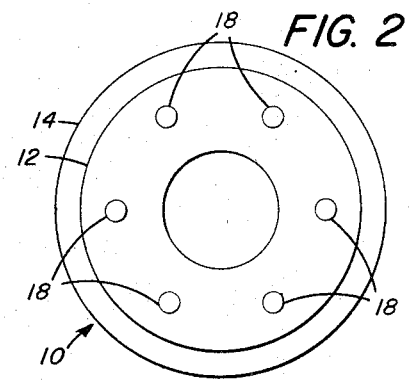
FIG. 2 is a side elevation view of the hub member shown in FIG. 1.
Figure 5:
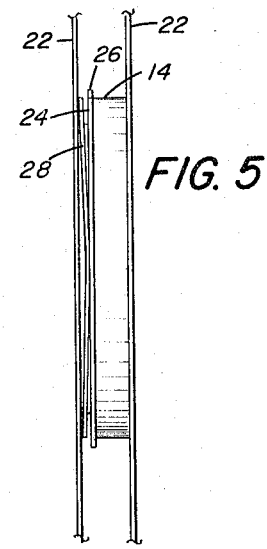
FIG. 5 is a front elevation view of the reel in its assembled condition.
Figure 6:
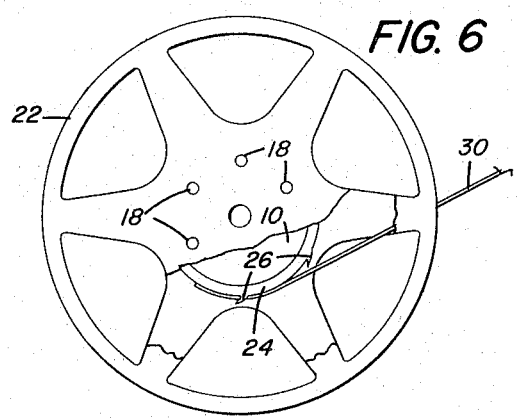
FIG. 6 is a side elevation view of the reel with a portion thereof broken away to show the leading end of the film attached to the clutch disk.

Referring to the drawing, a preferred embodiment of a take-up reel according to the present invention is disclosed in FIG. 1 as comprising a hub member 10 having a circular land 12 of one diameter, and an adjacent circular land 14 of a greater diameter. An annular shoulder or surface 16 interconnects lands 12, 14. Each side of hub member 10 is provided with a plurality of protuberances 18 adapted to extend through complementary recessed openings 20 in a reel flange 22, and to extend past the side of the flange. The flanges 22 are rigidly riveted to hub member 14 by applying pressure to the ends of the protuberances 18, flattening them over the edges of openings 20. Before the flanges 22 are secured to hub member 10, an annular clutch disk 24 as best seen in FIG. 3 is loosely mounted on land 12 with one side thereof in engagement with shoulder 16. The inner diameter of disk 24 is slightly greater than the diameter of land 12 so that the clutch disk is free to rotate thereon. The outer periphery of clutch disk 24 has a diameter that is substantially equal to the diameter of land 14, and further has a plurality of teeth 26 extending outwardly from the outer periphery. An annular bowed spring 28 as best seen in FIG. 4 is mounted on land 12 and has portions of one side bearing against clutch disk 24, and its opposite side engaging the inner surface of the flange 22. In this position, spring 28 is slightly compressed as seen in FIG. 5 for urging clutch disk 26 into engagement with shoulder 16 with a constant, predetermined force. Accordingly, when the reel is rotating and the leading end of a film 30 is fed onto hub 10 of the reel as seen in FIG. 6, and becomes attached to teeth 26 on clutch disk 24, the clutch disk will slip with respect to the faster rotating reel until the rotational velocity of the reel is reduced to properly accommodate the speed at which the film is being transported thereto. The frictional force between clutch disk 24 and hub member 10 is substantially constant no matter what portion of the clutch disk is engaged by film 30.

The invention has been described in detail with particular reference to a preferred embodiment thereof, but it will be understood that variations and modifications can be effected within the spirit and scope of the invention as described hereinabove and as defined in the appended claims.

I claim:
1. In a take-up reel for perforated film, the combination comprising:
    a rotatably driveable hub member having a film-receiving portion onto which said film can be wound, and further having a surface transverse to its axis;
    a clutch member rotatable relative to and coaxially with said hub member and having one side thereof in engagement with said surface;
    said clutch member having a plurality of teeth extending from its periphery beyond the periphery of said film-receiving portion of said hub member for engaging the perforations of a film as it is directed into winding relationship with said film-receiving portion; and
    resilient means for urging said one side of said clutch member into frictional engagement with said surface whereby said clutch member normally rotates with said hub member when the latter is driven, said resilient means providing controlled slippage between said hub member and said clutch member when a film traveling at a speed slower than the periphery of said film-receiving portion of said hub member is initially engaged by said clutch teeth.

2. The invention according to claim 1 wherein said clutch member is rotatably supported by said hub member.

3. The invention according to claim 1 and further including a flange secured to one side of said portion of said hub member for guiding a film as it is wound thereon.

4. In a take-up reel for perforated film, the combination comprising:

a rotatably driveable hub member of a width slightly greater than the width of a film, and having a first substantially circular land of one diameter and a second substantially circular land of a larger diameter onto which said film is wound, said lands being interconnected by an annular surface transverse to said lands;

a respective flange secured to each end of said hub member, said flanges forming an open chamber into which said film can be wound on said hub member;

an annular clutch disk loosely mounted for rotation on said first land and having one side thereof in engagement with said surface;

said clutch disk having an outer periphery of a diameter substantially equal to the diameter of said second land, and a plurality of teeth extending from said periphery beyond said second land for engaging the perforations of a film as it is directed into winding relationship with said second land; and resilient means in engagement with said clutch disk for urging said disk into frictional engagement with said surface whereby said clutch disk normally rotates with said hub member when the latter is driven, said resilient means providing controlled slippage between said hub member and said disk when a film traveling at a speed slower than the periphery of said hub is initially engaged by said teeth.

5. The invention according to claim 4 wherein said resilient means comprises an annular spring mounted on said first land and interposed between one of said flanges and said disk.

6. In a take-up reel for perforated film the combination comprising:

rotatably driveable hub means having a peripheral film receiving portion;

film engaging means coaxial with and rotatable with respect to said hub means, said film engaging means having teeth extending outwardly beyond the periphery of said hub means for engaging film perforations;

and means acting by pressure in an axial direction with respect to said hub means and film engaging means to provide controlled slippage therebetween upon initial engagement of film with said film engaging means.

7. A reel as set forth in claim 6 including a flange means attached to said hub means for guiding the winding of film on said hub means, said film engaging means and said pressure acting means being located between said flange means and said hub means.

References Cited by the Examiner

UNITED STATES PATENTS

| | | | |
|---|---|---|---|
| 1,322,114 | 11/1919 | Jenkins | 242—74.2 |
| 2,728,530 | 12/1955 | Goldberg et al. | 242—71.8 |
| 2,859,919 | 11/1958 | Debrie | 242—71.8 X |
| 3,053,465 | 9/1962 | Michaels | 242—55.11 |

References Cited by the Applicant

| | | |
|---|---|---|
| 2,004,608 | 6/1935 | Howell. |
| 2,483,528 | 10/1949 | Christoff. |

FRANK J. COHEN, *Primary Examiner.*

N. L. MINTZ, *Assistant Examiner.*